Jan. 3, 1939.                T. F. BRANDT                2,142,233
              EXPANSION CHAMBER FOR BUSHING INSULATORS
                       Filed Sept. 9, 1937

INVENTOR
Thomas F. Brandt
BY
ATTORNEY

Patented Jan. 3, 1939

2,142,233

UNITED STATES PATENT OFFICE 2,142,233

EXPANSION CHAMBER FOR BUSHING INSULATORS

Thomas F. Brandt, Barberton, Ohio, assignor to The Ohio Brass Company, Mansfield, Ohio, a corporation of New Jersey Application September 9, 1937, Serial No. 163,097

4 Claims. (Cl. 173—318)

This invention relates to oil filled bushing insulators and has for one of its objects the provision of a seal for the oil in a bushing insulator which will permit breathing produced by expansion or contraction of the oil in the bushing, but which will exclude the outer atmosphere from contact with the bushing oil.

A further object of the invention is to provide a device of the class named which shall be of improved construction and operation.

Other objects and advantages will appear from the following description.

The invention is exemplified by the combination and arrangement of parts shown in the accompanying drawing and described in the following specification and it is more particularly pointed out in the appended claims.

Figure 1:
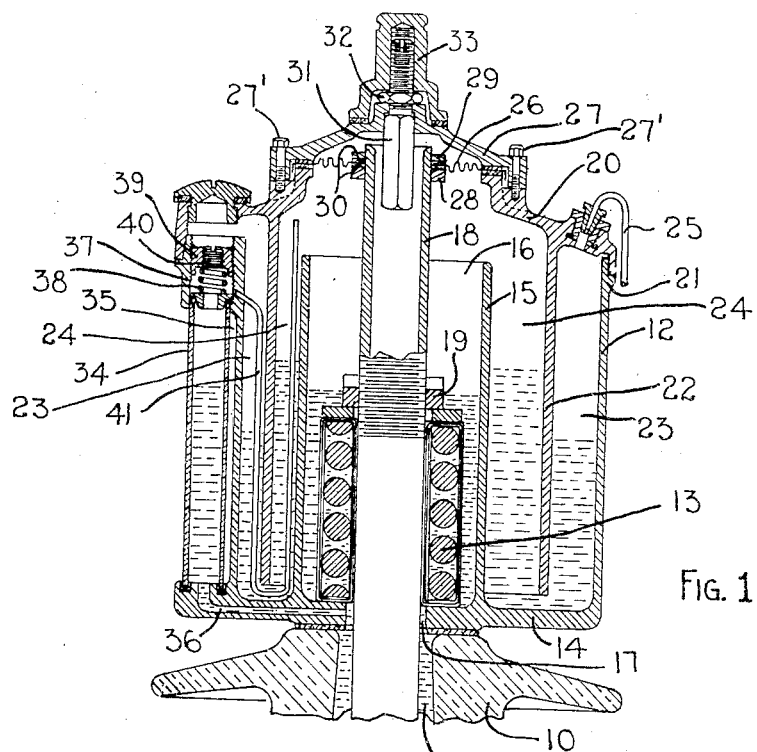
Fig. 1 is a vertical sectional view of the expansion reservoir of a bushing insulator arranged according to the present invention.

In Fig. 1 the numeral 10 designates the upper portion of the porcelain cone of an oil filled bushing insulator. The general construction of the bushing may be similar to that shown in Patent 1,994,267 granted March 12, 1935 to Arthur O. Austin, or 1,972,590 granted September 4, 1934 to Ralph Higgins.

The invention, of course, is not restricted to any specific bushing construction other than as pointed out in the appended claims. The interior of the bushing is filled with oil or other insulating liquid. An expansion chamber 12 is mounted on the top of the cone 10 and is held tightly against the upper end of the cone by a helical spring 13, which holds the parts of the bushing in assembled relation. Extending upwardly from the bottom 14 of the reservoir 12 is a cylindrical wall or baffle 15 enclosing a chamber 16. The baffle 15 may be cast integral with the floor 14 and the interior of the bushing communicates with the interior of the compartment 16 through the opening 17 which extends through the floor 14. The interior of the compartment 16 is in free communication with the interior of the bushing and the oil 11 extends up in the compartment 16 so as partly to fill the compartment, as indicated in the drawing. The conductor tube 18 extends loosely through the opening 17 and is provided with a nut 19 which bears on the spring 13 to hold the bushing parts together. The reservoir 12 is provided with a top ring 20 which fits upon a seat 21 on the wall of the reservoir and is tightly sealed to the reservoir wall as by soldering. A baffle wall or cylinder 22 extends downwardly from the top ring 20 to a point closely adjacent the floor 14, thus providing chambers 23 and 24 which are in communication with each other through the space below the lower edge of the baffle 22 and which are separated from the inner chamber 16 by the baffle 15. The outer chamber 23 communicates with the outer atmosphere through a breather tube 25, but the chambers 16 and 24 are sealed by a flexible diaphragm 26 which forms a tight joint with the upper end of the conductor tube 14 and with the upper edge of the ring 20. A cover plate 27 clamps the diaphragm 26 in place, the joint being sealed by suitable gaskets. The cover plate is held to the ring by cap screws 27'. The inner edge of the diaphragm is sealed to the conductor tube 18 by a stop ring 28 threaded and soldered to the tube 18 and by a ring nut 29 and gaskets 30. A conductor terminal 31 may be connected to a conductor lead which extends into the apparatus housing upon which the bushing is mounted and the conductor lead may be drawn up through the tube 18 and secured to the cover plate 27 by a nut 32. A blind nut terminal 33 is threaded on the upper end of the lead terminal 31 to seal the opening in the cover plate 27 and to provide means for connecting an external conductor to the conductor lead.

It will be seen that the communicating chambers 23 and 24 form a seal for the upper portion of the expansion chamber, one leg of the seal communicating with the outer atmosphere, while the other leg communicates with the upper portion of the chamber 16. The space above the chamber 16 may be filled with dry air or an inert gas which will not affect the oil in the bushing.

In the operation of bushings, the temperature may vary considerably throughout any one day and night, and also from day to day and from season to season. This produces expansion and contraction of the oil in the bushing which, of course, causes a breathing action between the space above the oil and the outer atmosphere. Heretofore, where this breathing has taken place directly between the space above the oil and the atmosphere, the oil gradually becomes affected by contact with the atmosphere, and particularly, by the absorption of water from the air. This is a condition that it is desirable to avoid. In applicant's invention as described above, the bushing oil never comes into contact with the external atmosphere, but only with the neutral gas that fills the chambers 16 and 24. The sealing oil in the chambers 23 and 24 separates the neutral gas from the outer atmosphere, and although the outer leg of the seal contacts with the air in the space 23, the oil of the seal is not used for insulating purposes, and contamination of this oil by contact with the outer atmosphere produces no detrimental results.

In order that the operator may check the height of the oil in the bushing, a gage glass 34 is arranged in a re-entrant recess 35 in the reservoir 12. The lower end of the gage glass communicates with the interior of the bushing through a passage 36. A socket 37 is provided for retaining the upper end of the glass, the glass being tightly sealed and held by a spring 38. The upper end of the glass is sealed against communication with the interior chamber 23 by a bearing ring 39 for the spring 38 and by a sealing plug 40. The joint may be rendered perfectly tight from leakage by soldering the parts after they are in place. A tube 41 communicates with the space above the glass 34 and extends downwardly beneath the lower edge of the baffle 22 and into the space above the chamber 16, so that the pressure on the oil surface in the gage glass will be the same as that on the surface of the oil in the chamber 16. This will insure the same surface level in the gage glass as in the chamber 16, thus giving a correct indication of the amount of oil in the bushing.

It will be apparent that the chamber 16 must have sufficient capacity to accommodate the maximum variation in the surface level of the oil 11 without at any time causing the oil to overflow the upper edge of the baffle 15. It will also be apparent that the chambers 23 and 24 must be of sufficient capacity so that neither leg of the seal will pass below the bottom of the baffle 22 and so that the surface level in the chamber 24 will never cause the oil to overflow the upper edge of the baffle 15. The arrangement described will permit free expansion and contraction of oil in the bushing, but the outer atmosphere will always be excluded from contact with the surface of the oil.

Figure 2:
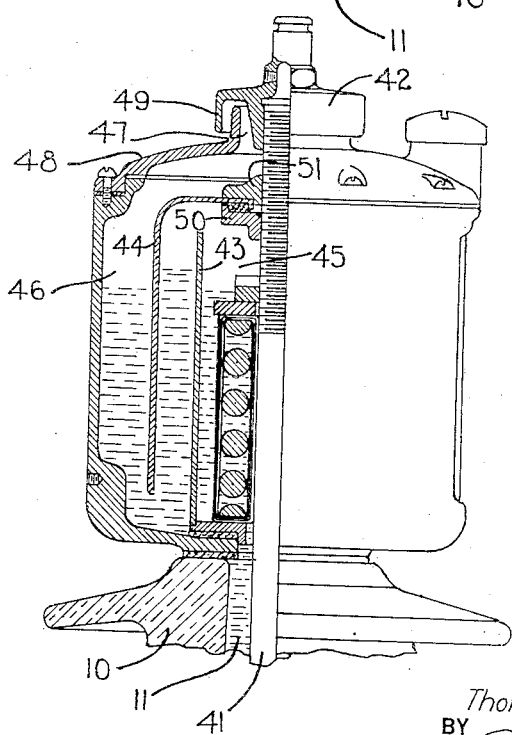
Fig. 2 is an elevation of a bushing reservoir with parts in section showing a modified form of the invention.

Fig. 2 shows the invention applied to a bushing in which the conductor rod 41 extends entirely through the expansion chamber and is provided at its top with a terminal 42. In this case, the baffles 43 and 44 corresponding respectively to the baffles 15 and 22 in Fig. 1 are shown as formed of sheet metal instead of being cast integral with the parts of the expansion chamber. The inner chamber 45 communicates with the oil space in the bushing 10 the same as in Fig. 1, but the outer leg of the oil seal formed by the chamber 46 communicates with the outer atmosphere through an opening 47 in the cover plate 48, the opening being protected from the atmosphere by a canopy 49. The baffle 44 is hermetically sealed to the conductor 41 by a bearing flange 50 and ring nut 51. The operation of the form of the invention shown in Fig. 2 is similar to that shown in Fig. 1.

I claim:

1. The combination with a bushing insulator of an expansion reservoir having an inner chamber communicating with the interior of said insulator, liquid in said insulator and said chamber and partially filling said chamber, said reservoir having a second chamber surrounding said expansion chamber, a baffle separating said second chamber into two compartments, one of said compartments being sealed to the outer atmosphere and communicating with the space in said expansion chamber above the surface of the liquid therein, the upper portion of the other compartment being open to atmosphere, a sealing liquid partially filling said compartments, said compartments having a communicating passage below the surface level of the liquid therein and a filling gas confined in the space above the liquid in said expansion chamber and the liquid in the compartment communicating therewith.

2. The combination with a bushing insulator of an expansion reservoir mounted on said insulator, a baffle wall forming an expansion chamber communicating at its lower end with the interior of said insulator, a cover for said expansion reservoir having a baffle wall extending downwardly therefrom and enclosing said expansion chamber, the wall of said expansion reservoir surrounding said downwardly extending baffle and forming a pocket into which said downwardly extending baffle projects, said pocket being divided by said downwardly extending baffle into two compartments communicating with each other at their lower ends, an insulating liquid filling said bushing insulator and a portion of said expansion chamber, and a sealing liquid partially filling said pocket and forming a seal for the space above the liquid in said expansion chamber.

3. The combination with a bushing insulator of means forming an expansion chamber communicating therewith, insulating liquid filling said bushing insulator and extending into said expansion chamber, a liquid trap for sealing the upper portion of said expansion chamber against contact with the outer atmosphere, said trap surrounding said expansion chamber, a gage glass outside of said trap and having its lower end communicating with the interior of said bushing insulator and a tube extending through said trap for connecting the upper end of said gage glass with the space between said liquid trap and the upper portion of said expansion chamber.

4. The combination of a bushing insulator of an expansion reservoir therefore having its bottom resting on the upper portion of said insulator and having a baffle extending upwardly from said bottom dividing said reservoir into outer and inner chambers, insulating liquid filling said insulator and a portion of said inner chamber, a cover for said reservoir having a baffle thereon extending downwardly into said outer chamber and dividing said outer chamber into two compartments, the inner one of which communicates with the upper portion of said inner chamber, and the outer one of which communicates with the outer atmosphere, said compartments being connected at their lower ends, a sealing liquid in said outer chamber forming a trap for excluding the atmosphere from said inner chamber and said inner compartment, a gage glass disposed outside of said outer compartment, means providing a passage connecting the bottom of said gage glass with the liquid in said bushing insulator and a tube having one end communicating with the upper portion of said gage glass and the other end communicating with the space above the liquid in said inner chamber and said inner compartment to insure a pressure on the top of the liquid in said gage glass equal to the pressure on the top of said bushing insulator said tube extending through said compartments and through the connection at their lower ends from one of said compartments into the other.

THOMAS F. BRANDT.